United States Patent
Butler et al.

(10) Patent No.: US 6,192,912 B1
(45) Date of Patent: Feb. 27, 2001

(54) LOW PROFILE PNEUMATICALLY ACTIVATED VALVE ASSEMBLY

(75) Inventors: Ronald G. Butler, Mountville; Wayne R. Houck; Edwin R. Tipton, both of Columbia; John R. Lehman, Maytown; Bruce Rowits, Ephrata, all of PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/512,527

(22) Filed: Feb. 24, 2000

(51) Int. Cl.[7] .................................................. F02B 27/00
(52) U.S. Cl. ........................ 137/15.19; 137/270; 251/61.2
(58) Field of Search ........................... 251/61.1, 61.2, 251/61.3, 61.4, 61.5; 137/270, 269, 15.19

(56) References Cited

U.S. PATENT DOCUMENTS 3,719,343 * 3/1973 Werra .............................. 251/61.2 X
4,901,749 * 2/1990 Hutto ................................. 137/270

* cited by examiner

Primary Examiner—Kevin Lee
(74) Attorney, Agent, or Firm—Menotti J. Lombardi

(57) ABSTRACT

A low profile pneumatically actuated valve assembly including a pneumatic actuator, a bonnet, and an elongated hollow member disposed within the valve actuator, the member having a threaded portion extending from within the actuator, the threaded portion of the member threadedly engaging a correspondingly threaded portion of the bonnet, thereby fastening the actuator to the bonnet. The pneumatically actuated valve assembly further includes a tab and slot arrangement defined by the actuator and the bonnet which permits the actuator and the bonnet to be rotatively positioned relative to each other in at least 90 degree increments to selectively position the air inlets.

21 Claims, 4 Drawing Sheets

LOW PROFILE PNEUMATICALLY ACTIVATED VALVE ASSEMBLY

FIELD OF THE INVENTION

This invention relates to pneumatically actuated valve assemblies, and in particular, to a low profile pneumatically actuated valve assembly having an actuator housing that can be rotated in at least 90 degree increments to allow selective positioning of assembly's air inlets.

BACKGROUND OF THE INVENTION

The Sanitary/Pharmaceutical/Biotek industry's increasing use of process fabrications, the move toward block bodied and multiport diaphragm valve body designs, and the shrinking dimensional envelope for process components, has created a need for compact valve/pneumatic actuator packages. Low profile pneumatically actuated valve assemblies are used in these industries to provide such compact valve/actuator packages. Lower valve assembly heights are desirable in these applications because space is limited.

Present low profile pneumatically actuated valve assemblies typically have molded blind threaded inserts. Such inserts operate adequately when assembling the valve assembly to the valve body if the body's design provides full access to the assembly fasteners which are usually bolt fasteners. However, when the valve body requires a stud due to weldments prohibiting the use of a bolt fastener, actuators with blind inserts can not be assembled to the valve due to neither the stud nor the insert being able to rotate.

One solution to this problem has been to mount a cast stainless spool adapter between the valve body and actuator, in order to permit mounting to valve bodies requiring studs. This solution, however, undesirably added between 1.38" and 2.38" to the valve assembly's height.

Another solution to this problem has been to provide a cast bonnet made from stainless steel. The bonnet has lower and upper flanges. The lower flange permits the bonnet to be mounted to the valve body using studs in the valve body and nuts on the bonnet. The upper flange permits the lower actuator housing, which has blind threaded inserts molded in place, to be mounted to the bonnet by passing bolts through the bonnet's upper flange and threading them into the lower housing's blind inserts.

The cast bonnet design also has several limitations. The "bolt" pattern defined by the blind inserts in the lower actuator housing section, permit mounting of the bonnet in only one orientation relative to the valve body or process pipeline. The plastic lower housing section mounts in only one direction to the bonnet, hence, the housing's threaded air inlet boss position is not adjustable. This limits how close end users can run adjacent lines on the skid where space is limited due to interference of piping connections required to supply air to the lower housing section.

Another limitation of the cast bonnet/lower actuator housing design is that the bonnet and lower actuator housing section cannot be sealed from each other. If the process fluid is a chemical or solution that attacks the material of the plastic lower housing section, a failed valve diaphragm will result in contact of the process fluid and the lower housing material. The end result of this is a breakdown of the plastic material and eventually total failure of the component and risk of injury to the end user's operator.

Accordingly, a need exists for a low profile pneumatically actuated valve assembly which overcomes the shortcomings of the prior art.

SUMMARY OF THE INVENTION

A low profile pneumatically actuated valve assembly comprising a pneumatic actuator, a bonnet, and an elongated hollow member disposed within the pneumatic actuator, the member having a threaded portion extending from within the actuator, the threaded portion of the member threadedly engaging a correspondingly threaded portion of the bonnet, thereby fastening the actuator to the bonnet.

One aspect of the invention involves a tab and slot arrangement defined by the actuator and the bonnet which permits the actuator and the bonnet to be rotatively positioned relative to each other in at least 90 degree increments to permit air inlets of the actuator to be selectively positioned.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not to scale.

DETAILED DESCRIPTION OF THE INVENTION

Figure 1:
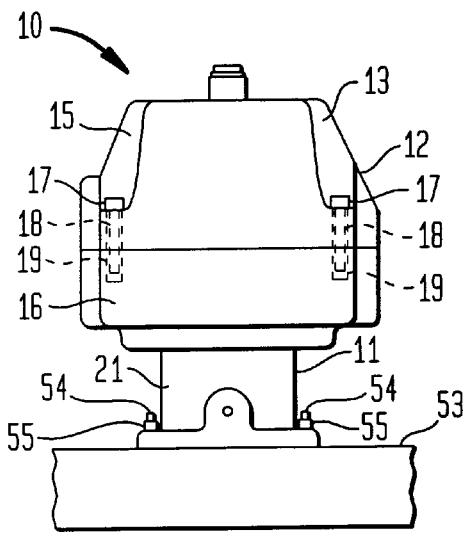
FIG. 1 is an elevational view of a pneumatically actuated valve assembly according to an embodiment of the invention, with its components assembled in a first rotational orientation.
Figure 2:
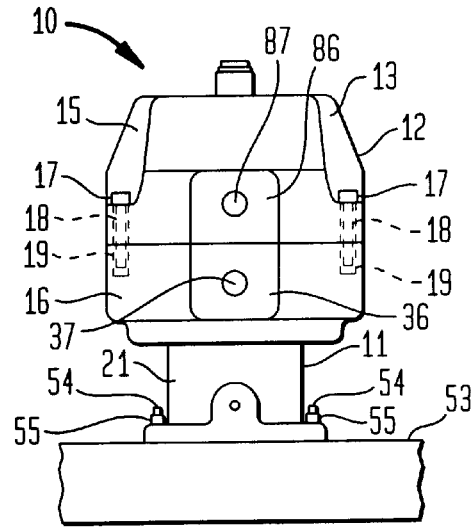
FIG. 2 is an elevational view of the pneumatically actuated valve assembly of FIG. 1 with its components assembled in a second rotational orientation.
Figure 3:
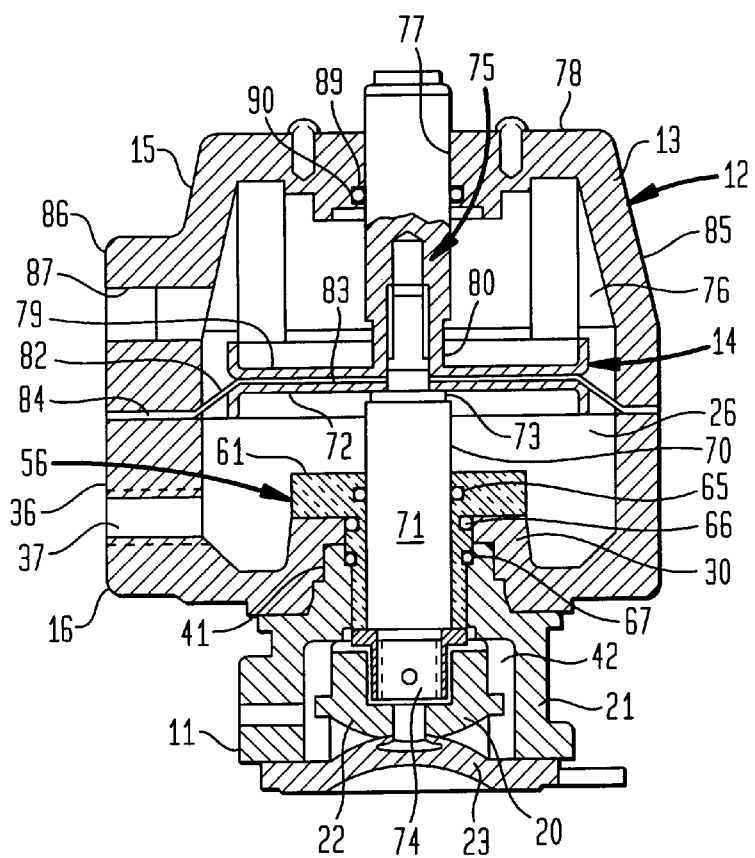
FIG. 3 is a sectional view of the pneumatically actuated valve assembly of the invention.

FIGS. 1–3 show a low profile pneumatically actuated valve assembly 10 according to an embodiment the invention. The assembly 10 generally includes a bonnet 21, a compressor 20 encased in the bonnet 21 and a pneumatic actuator 12 which actuates the compressor 20. The actuator 12 and the bonnet 21 are coupled together by a bushing 56 as will be explained further on in greater detail. The actuator 12 includes an actuator housing 13 and a valve spindle arrangement 14 disposed within the actuator housing 13. The actuator housing 13 is formed by upper and lower housing sections 15, 16 which are each molded from plastic. The housing sections 15, 16 are fastened together with threaded fasteners 17, such as bolts that extend through openings 18 in the upper housing section 15 and thread into molded threaded inserts 19 in the lower housing section 16.

The bonnet 21 is typically made from investment cast stainless steel. The compressor 20 has a convex face 22 with a flexible valve diaphragm 23 coupled thereto for opening and closing port openings in valve bodies and other like devices when actuated by the valve spindle arrangement 14 of the actuator 12.

Figure 4A:
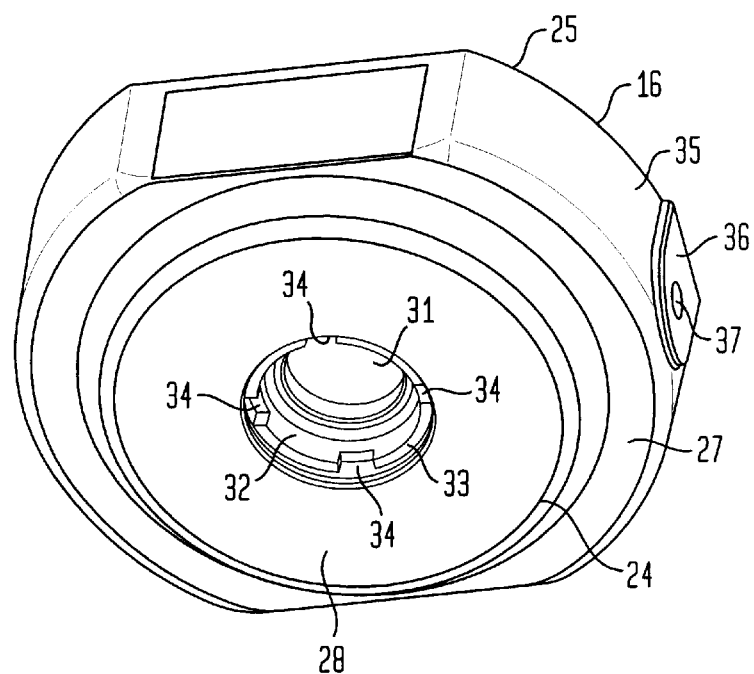
FIG. 4A is a bottom perspective view of a lower actuator housing section used in the invention.
Figure 4B:
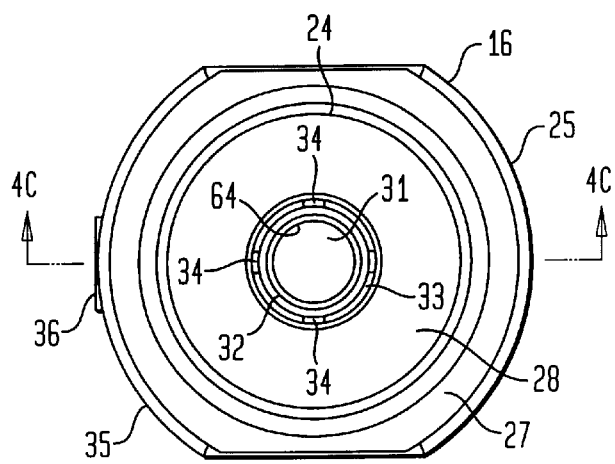
FIG. 4B is a bottom view of the lower actuator housing section.
Figure 4C:
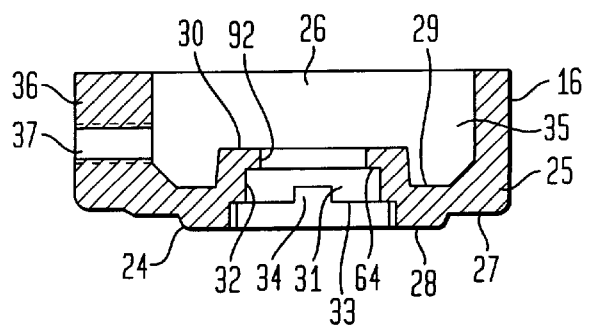
FIG. 4C is a cross-sectional view through line 4C—4C of the lower actuator housing section of FIG. 4B.

As shown in FIGS. 4A–4C, the lower housing section 16 includes a main wall 24, a side wall 25 extending about the periphery of the main wall 24, and a chamber 26 defined by the main and side walls 24, 25. The main wall 24 includes a peripheral wall portion 27 surrounding a protruding wall portion 28. The inner surface 29 of the protruding wall portion 28 includes a centrally disposed bushing boss 30. A bore 31 having a multi-stepped inner surface 32 extends through the bushing boss 30. The outermost step 33 of the bore surface 32 includes four slots 34 which are spaced apart about 90 degrees from one another. The outer surface 35 of the side wall 25 includes an air inlet boss 36 with a screw-threaded air inlet 37 extending therethrough to the chamber 26.

Figure 5A:
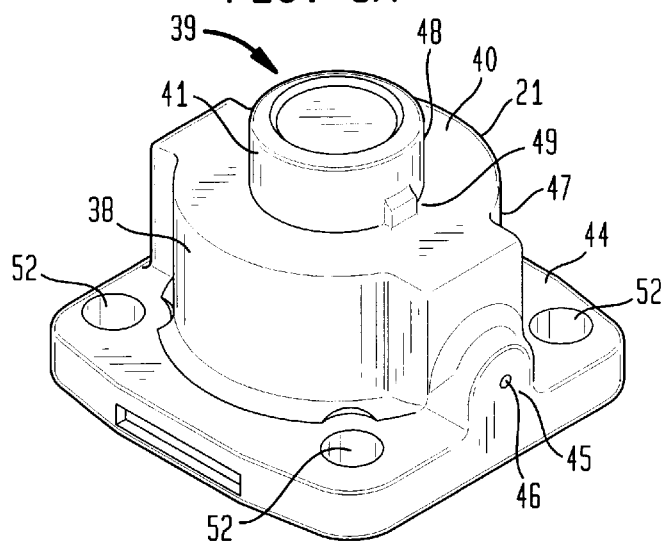
FIG. 5A is a top perspective view of a bonnet used in the invention.
Figure 5B:
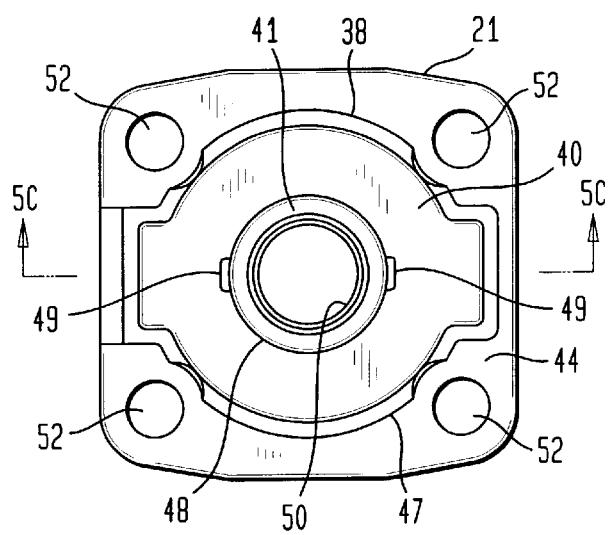
FIG. 5B is a top view of the bonnet.
Figure 5C:
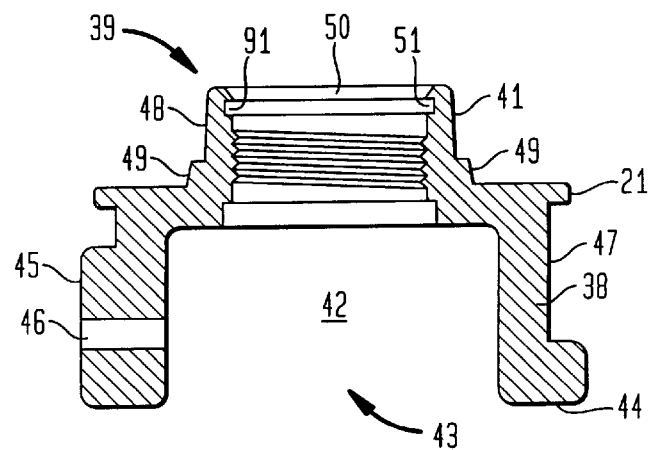
FIG. 5C is a cross-sectional view through line 5C—5C of the bonnet of FIG. 5B.

As shown in FIGS. 5A–5C, the bonnet 21 includes a generally cylindrical wall 38 having a first end 39 that includes an end wall 40 with a generally cylindrical coupling member 41 which permits communication with the interior 42 of the bonnet 21, and an opposing open end 43 surrounded by a mounting flange 44. A boss 45 having a vent hole 46 extending into the interior 42 of the bonnet 21 is provided on the outer surface 47 of the cylindrical wall 38. If desired, the vent hole 46 can be drilled and tapped to provide threads so the vent hole 46 can be sealed by a pipe plug (not shown). The coupling member's outer surface 48 includes a pair of outwardly projecting tabs 49 spaced about 180 degrees apart from one another. The portion of the inner surface 51 of the coupling member 41 at the opening includes a counterbore 91 and the portion of the inner surface 51 just below the counterbore 91 includes a screw thread 50. The bonnet flange 44 includes apertures 52 which permit the valve mechanism 11 to be mounted to a valve body 53 using threaded studs 54 (threaded into the valve body) and corresponding nuts 55 threaded on the studs 54 against the bonnet flange 44 as shown in FIGS. 1 and 2.

In FIG. 3, the bushing 56 extends through the bushing boss 30 in the lower actuator housing section 16. The bushing 56 operates to clamp the lower actuator housing section 16 and bonnet 21 together, thereby eliminating the use of a spool adapter as found in many conventional pneumatically actuated valve assemblies. Accordingly, the valve assembly 10 of the invention has substantially lower overall height or profile than conventional pneumatically actuated valve assemblies. The bushing 56 also serves as a guide/seal for the valve spindle arrangement 14 disposed in the actuator housing 13 as will be explained further on.

Figure 6A:
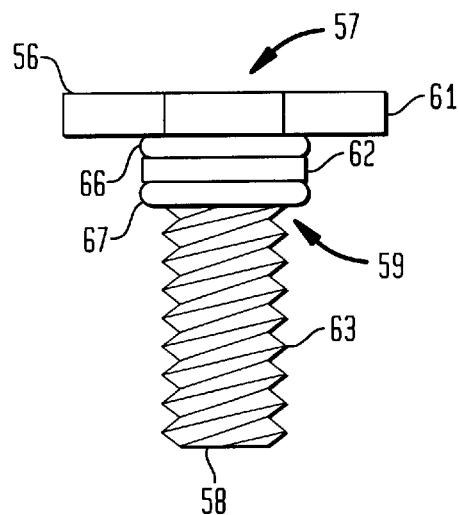
FIG. 6A is an elevational view of a bushing used in the invention.
Figure 6B:
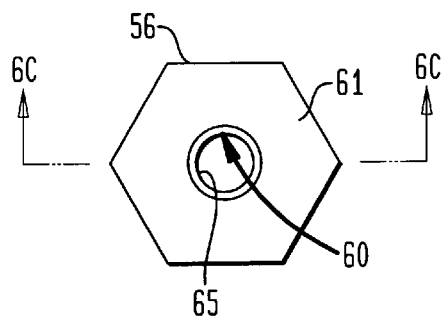
FIG. 6B is a top view of the bushing.
Figure 6C:
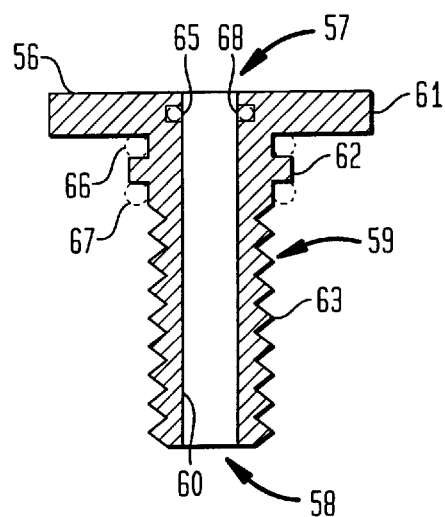
FIG. 6C is a cross-sectional view through line 6C—6C of the bushing of FIG. 6B.

As shown in FIGS. 6A–6C, the bushing 56 is a hollow member having first and second ends 57, 58 and cylindrical outer and inner surfaces 59, 60. A first flange 61 extends outwardly from the bushing's outer surface 59 at the first end 57 thereof. A second smaller flange 62 extends outwardly from the bushing's outer surface 59 a short distance below the first flange 61. The lower portion of the bushing's outer surface 59 spaced below the second flange 62 is screw threaded 63. The first flange 61 is typically constructed as a hexagonal member, to permit the attachment of a driving tool such as socket wrench, which can be used for rotating the bushing.

Referring again to FIG. 3, the lower actuator housing section 16 is mounted on the bonnet 21 and rotated relative to the bonnet 21 to a desired one of four (4) air inlet positions (FIGS. 1 and 2 show the lower housing section 16 rotated in two of the four available air inlet positions). When so mounted, the coupling member 41 inserts into the bore 31 of the lower housing section 16, the end thereof engaging the innermost bore step 64 and the two tabs 49 of the coupling member 41 engaging a selected pair of slots 34 defined in the outermost bore step 33. The bushing 56 is then threaded into the coupling member 41 of the bonnet 21 until the lower surface of the first flange 61 abuts against the bushing boss, thereby, clamping the lower actuator housing section 16 to the bonnet 21. The bushing 56 and the tab 49 and slot 34 arrangement, maintain the selected rotational position of the lower housing section 16 and prevent separation and rotation of these components.

The tab 49 and slot 34 arrangement permit the lower housing section 16 to be incrementally positioned every 90 degrees by merely unthreading the bushing 56 and rotating the lower housing section 16 relative to the bonnet 21 to engage the bonnet tabs 49 with a pair of the housing slots 34 that provide the desired lower housing section air inlet 37 position. By enabling the end user to select the location of the air inlet 37, savings in system space are advantageously realized.

As stated earlier, the bushing 56 serves as a fluid seal for the valve spindle arrangement 14 and seals off the actuator housing 13 from the bonnet 21 and, therefore, from process fluid. The bushing 56 accomplishes this function by employing a plurality of resilient fluid sealing members 65, 66, 67 (FIGS. 6A and 6C) which fluid isolate or seal the lower actuator housing section 16 from the bonnet 21 preventing process fluid from making contact with the lower housing section 16 should there be a valve diaphragm failure 23. This permits the valve assembly 10 to be used in applications which employ process fluids that could be potentially harm the plastic material of the actuator housing sections 15, 16 in the event of a valve diaphragm failure 23. The fluid sealing members 65, 66, 67 typically include O-rings made from an elastomeric material or other suitable fluid sealing material. A first O-ring 65 is disposed in a groove 68 defined in the inner surface 60 of the bushing 56 adjacent the first end 57 thereof. The first O-ring 65 seals the chamber 26 of the lower actuator housing section 16 by providing a seal between the inner surface 60 of the bushing 56 and the outer surface 70 of a first stem 71 of the valve spindle arrangement 14. The seal created by the first O-ring 65 prevents air in the actuator 12 from entering the bonnet 21 and prevents fluid from entering the actuator 12 due to a failed diaphragm 23. A second O-ring 66 is disposed in the space defined between the first and second bushing flanges 61, 62. The second O-ring 66 also seals the chamber 26 of the lower actuator housing section 16 by providing an air seal between the outer surface 59 of the bushing 56 and the innermost step 92 of the bore 31 in the lower actuator housing section 16. A third O-ring 67 is disposed in the space defined between the second flange 62 and the screw thread 63. The third O-ring 67 provides a liquid seal between the inner surface portion 51 of the bonnet's coupling member 41 and the outer surface 59 of the bushing 56.

Referring again FIG. 3, the valve spindle arrangement 14 includes the first stem 71 mentioned earlier on, which extends down from the chamber 26 of the lower actuator housing section 16 through the bushing 56 into the bonnet 21. A first diaphragm plate 72 is disposed at the upper end 73 of the first stem 71 and the earlier mentioned compressor 20 is disposed at the lower end 74 of the first stem 71 inside the bonnet 21. The valve spindle arrangement 14 further includes a second stem 75 which extends up from the chamber 76 of the upper actuator housing section 15, through a bore 77 defined in the upper housing section's main wall 78. A second diaphragm plate 79 is disposed at the lower end 80 of the second stem 75. The upper end 73 of the first stem 71 is coupled to the lower end 80 of the second stem 75. A flexible diaphragm member 82 separates the chambers 76, 26 of the upper and lower housing sections 15, 16. The flexible diaphragm member 82 has a central portion 83 which is clamped between the diaphragm plates 72, 79 of the first and second stems 71, 75. A peripheral portion 84 of the diaphragm member 82 is clamped between the upper and lower actuator housing sections 15, 16.

The upper actuator housing section 16 further includes a side wall 85 extending about the periphery of the main wall 78. An air inlet boss 86 with a screw threaded air inlet opening 87 extending into the upper housing chamber 76, is formed on the outer surface 88 of the upper housing section side wall 85. The bore 77 in the upper housing section's main wall 78 includes a groove 89 that retains an O-ring 90. This O-ring 90 seals the chamber 76 of the upper housing section 15 by providing an air seal between the inner surface of the upper housing section bore 77 and the outer surface of the second stem 75.

In operation, air pressure delivered into the chamber 76 of the upper actuator housing section 15 via the housing section's air inlet 87, and air exhausted from the chamber 26 of the lower actuator housing section 16 via its air inlet 37, cause the stems 71, 75 of the valve spindle arrangement 14 to move toward the valve assembly, thus, causing the compressor 20 to emerge from the bonnet 21. As the compressor 20 emerges from the bonnet 21, it forces the valve diaphragm 23 across the port opening of an associated valve body. Air pressure delivered into the chamber 26 of the lower actuator housing section 16 via that housing section's air inlet 37, and air exhausted from the chamber 76 of the upper actuator housing section 15 via its air inlet 87, cause the stems 71, 75 of the valve spindle arrangement 14 to retract the compressor 20 back into the bonnet 21, withdrawing the valve diaphragm 23 away from the port opening of the associated valve body. As the compressor 20 is being retracted back into the bonnet 21, the compressor 20 abuts against the second end 58 of the bushing 56. Accordingly, the bushing 56 also operates as a valve-stop.

The pneumatically activated valve assembly 10 of the invention is specifically adapted for used with process fabrications, tank bottom diaphragm valves, block bodied and multiport diaphragm valve body designs, or in applications where studded fasteners and spool adapters are currently required to fasten valve assemblies to valve bodies.

The pneumatically activated valve assembly 10 of the invention is especially useful in applications where it is necessary to locate the actuator 12 and the bonnet 21 of the assembly 10 in specifically oriented positions relative to one another. Although the embodiment of the invention described herein provides such positions in 90-degree increments, it is contemplated that in other embodiments of the invention, the tab 49 and slot 34 arrangement can be adapted or replaced with other types of structures which permit positioning at any degree of rotation, either incrementally or continuously. For example, additional pairs of slots can be provided to provide further increments of relative rotation between the lower housing section 16 and the bonnet 21. The ability to selectively orient the actuator 12 and the bonnet 21 of the valve assembly 10 in different positions relative to one another is beneficial in positioning the air inlets so they are located where space is available, specifically when additional connections must be made in the field which consume space.

The pneumatically activated valve assembly 10 of the invention can be adapted in some embodiments, to also permit the housing sections 15, 16 of the assembly 10 to be oriented in different positions relative to one another (90 degrees or 180 degrees) to provided further flexibility in the positioning of the air inlets 87, 37. Moreover, additional threaded inserts 19 can also be provided in the lower housing section 16, or other means, to provide further increments of relative rotation between the upper and lower housing sections 15, 16 if desired.

The pneumatically activated valve assembly 10 of the invention can be customized for various applications. For example, it is possible to assemble a large size actuator 12 to a small size bonnet 21 to satisfy customers with air pressure restrictions or inadequate spring forces to close the valve. In another example, it is possible to assemble a small size actuator 12 to a large size bonnet 21 for customers with space limitations, but reduced closure force requirements. Moreover, the upper and lower housing sections 15, 16 can be manufactured in any desired geometrical shape such as square or circular. The ability to customize the height, air inlet location, and shape of the valve assembly 10 permits its use in many potential applications. It permits smaller assemblies to be used in applications requiring low closure forces or larger assemblies for low-pressure closure application.

While the foregoing invention has been described with reference to the above embodiments, various modifications and changes can be made without departing from the spirit of the invention. Accordingly, all such modifications and changes are considered to be within the scope of the appended claims.

What is claimed is:

1. A low profile pneumatically actuated valve assembly comprising:
   a pneumatic actuator;
   a bonnet; and
   an elongated hollow member disposed within the pneumatic actuator, the member having a threaded portion extending from within the actuator, the threaded portion of the member threadedly engaging a correspondingly threaded portion of the bonnet, thereby fastening the actuator to the bonnet.

2. The pneumatically actuated valve assembly according to claim 1, wherein the member includes at least one fluid sealing member which substantially prevents fluid transfer from the bonnet to the actuator.

3. The pneumatically actuated valve assembly according to claim 1, further comprising a tab and slot arrangement defined by the actuator and the bonnet, the tab and slot arrangement permitting the actuator and the bonnet to be rotatively positioned relative to each other in at least 90 degree increments.

4. The pneumatically actuated valve assembly according to claim 3, wherein the actuator includes first and second housing sections, each of the housing sections including an air inlet, the first and second housing sections being rotatively positionable relative to each other in at least 90 degree increments.

5. The pneumatically actuated valve assembly according to claim 1, further comprising an arrangement of at least two tabs and at least two slots, said arrangement defined by the actuator and the bonnet, said arrangement permitting the actuator and the bonnet to be rotatively positioned relative to each other in a continuous or incremental manner.

6. The pneumatically actuated valve assembly according to claim 5, wherein the actuator includes first and second housing sections, each of the housing sections including an air inlet, the first and second housing sections being rotatively positionable relative to each other in a continuous or incremental manner.

7. The pneumatically actuated valve assembly according to claim 1, wherein the hollow member has a flange adapted to receive a driving tool which can be used for rotating the member to permit threaded coaction with the bonnet.

8. A low profile pneumatically actuated valve assembly comprising:
   a pneumatic actuator having an actuator housing and a valve spindle arrangement disposed within the actuator housing;
   a bonnet having a compressor encased in a bonnet, the compressor actuated by the valve spindle arrangement of the actuator; and
   a bushing disposed within the actuator housing, the bushing having a threaded portion extending from the housing and threadedly engaging a correspondingly threaded portion of the bonnet, thereby fastening the actuator and bonnet together.

9. The pneumatically actuated valve assembly according to claim 8, wherein a portion of the valve spindle arrangement extends through the bushing into the bonnet and couples to the compressor.

10. The pneumatically actuated valve assembly according to claim 9, wherein the bushing includes at least one fluid sealing member which substantially prevents fluid transfer from the bonnet to the actuator housing.

11. The pneumatically actuated valve assembly according to claim 8, wherein the bushing includes at least one fluid sealing member which substantially prevents fluid transfer from the bonnet to the actuator housing.

12. The pneumatically actuated valve assembly according to claim 8, further comprising a tab and slot arrangement defined by the actuator housing and the bonnet, the slot arrangement permitting the actuator and the bonnet to be rotatively positioned relative to each other in at least 90 degree increments.

13. The pneumatically actuated valve assembly according to claim 12, wherein the actuator housing includes first and second housing sections, each of the housing sections including an air inlet, the first and second housing sections being rotatively positionable relative to each other in at least 90 degree increments.

14. The pneumatically actuated valve assembly according to claim 8, further comprising an arrangement of at least two tabs and at least two slots, said arrangement defined by the actuator and the bonnet, said arrangement permitting the actuator housing and the bonnet to be rotatively positioned relative to each other in a continuous or incremental manner.

15. The pneumatically actuated valve assembly according to claim 14, wherein the actuator housing includes first and second housing sections, each of the housing sections including an air inlet, the first and second housing sections being rotatively positionable relative to each other in a continuous or incremental manner.

16. The pneumatically actuated valve assembly according to claim 8, wherein the bushing has a flange adapted to receive a driving tool which can be used for rotating the bushing to permit threaded coaction with the bonnet.

17. A low profile pneumatically actuated valve assembly comprising:
   a pneumatic actuator having an actuator housing and a valve spindle arrangement disposed within the actuator housing, the actuator housing including first and second housing sections, each of the housing sections including an air inlet;
   a bonnet having a compressor encased in a bonnet, the compressor actuated by the valve spindle arrangement of the actuator;
   a bushing disposed within the actuator housing, the bushing having a threaded portion extending from the housing and threadedly engaging a correspondingly threaded portion of the bonnet, thereby fastening the actuator and bonnet together, a portion of the valve spindle arrangement extending through the bushing into the bonnet and coupling to the compressor; and
   an arrangement of at least two tabs and at least two slots, said arrangement defined by the actuator housing and the bonnet, said arrangement permitting the actuator housing and the bonnet to be rotatively positioned relative to each other in a continuous or incremental manner.

18. The pneumatically actuated valve assembly according to claim 17, wherein the bushing includes at least one fluid sealing member which substantially prevents fluid transfer from the bonnet to the actuator housing.

19. The pneumatically actuated valve assembly according to claim 17, wherein the first and second housing sections can be rotatively positioned relative to each other in a continuous or incremental manner.

20. The pneumatically actuated valve assembly according to claim 17, wherein the bushing has a flange adapted to receive a driving tool which can be used for rotating the bushing to permit threaded coaction with the bonnet.

21. A method for adapting a pneumatically actuated valve assembly to a particular application, the method comprising the steps of:
   providing an elongated hollow member having a threaded portion;
   providing at least two differently sized pneumatic actuators, each of the actuators adapted to receive therewithin the elongated hollow member such that the threaded portion extends out from within the actuator;
   providing at least two differently sized bonnets, each of the bonnets having threaded portion for threadedly receiving the threaded portion of the elongated member;
   selecting a desired one of the at least two differently sized pneumatic actuators and a desired one of the at least two differently sized bonnets;
   positioning the elongated hollow member within the selected actuator; and
   threading the elongated hollow member into the threaded portion of the selected bonnet to fasten the selected actuator to the selected bonnet.

* * * * *